United States Patent
Marquart et al.

(10) Patent No.: US 12,115,962 B2
(45) Date of Patent: Oct. 15, 2024

(54) METHOD FOR OPERATING A BRAKING DEVICE

(71) Applicant: Robert Bosch GmbH, Stuttgart (DE)

(72) Inventors: Martin Marquart, Reichenbach (DE); Helmut Suelzle, Pleidelsheim (DE); Patrick Lellmann, Oedheim (DE)

(73) Assignee: ROBERT BOSCH GMBH, Stuttgart (DE)

(*) Notice: Subject to any disclaimer, the term of this patent is extended or adjusted under 35 U.S.C. 154(b) by 234 days.

(21) Appl. No.: 17/681,265

(22) Filed: Feb. 25, 2022

(65) Prior Publication Data
US 2022/0281427 A1    Sep. 8, 2022

(30) Foreign Application Priority Data
Mar. 3, 2021  (DE) ............... 10 2021 202 060.7

(51) Int. Cl.
| | |
|---|---|
| *B60T 8/88* | (2006.01) |
| *B60T 8/174* | (2006.01) |
| *B60T 8/92* | (2006.01) |
| *B60T 13/66* | (2006.01) |
| *B60T 17/22* | (2006.01) |
| *B60T 13/74* | (2006.01) |

(52) U.S. Cl.
CPC ............ *B60T 8/885* (2013.01); *B60T 8/174* (2013.01); *B60T 8/92* (2013.01); *B60T 13/662* (2013.01); *B60T 17/22* (2013.01); *B60T 13/74* (2013.01); *B60T 2270/402* (2013.01)

(58) Field of Classification Search
CPC . B60T 8/174; B60T 8/885; B60T 8/92; B60T 13/662; B60T 13/74; B60T 17/22; B60T 2270/402
See application file for complete search history.

(56) References Cited

U.S. PATENT DOCUMENTS

| | | | | |
|---|---|---|---|---|
| 9,022,488 B2* | 5/2015 | Beier | ...................... | B60T 17/18 |
| | | | | 303/20 |
| 10,562,510 B2* | 2/2020 | Woerner | .................. | B60T 8/17 |
| 10,766,472 B2* | 9/2020 | Farres | ..................... | B60T 8/172 |

FOREIGN PATENT DOCUMENTS

| | | | |
|---|---|---|---|
| DE | 102019208402 A1 | 12/2020 | |
| WO | 2017001315 A1 | 1/2017 | |

* cited by examiner

*Primary Examiner* — Hung Q Nguyen
*Assistant Examiner* — Mark L. Greene
(74) *Attorney, Agent, or Firm* — NORTON ROSE FULBRIGHT US LLP; Gerard A. Messina

(57) ABSTRACT

A method for operating a braking device of a vehicle, including a main braking system, and a backup braking system. The braking device includes a main braking system control unit, and a backup braking system control unit. The method includes detecting an error of a brake function of the braking system, locating the error inside the braking device, classifying the error with regard to the corresponding brake function and the braking system, and transferring a brake function detected as erroneous for the main braking system to the backup braking system in the event that the error concerns solely the main braking system, so that the brake function may still be carried out with the aid of the backup braking system.

12 Claims, 2 Drawing Sheets

METHOD FOR OPERATING A BRAKING DEVICE

FIELD

The present invention relates to a method for operating a braking device of a vehicle and a control unit that monitors the corresponding brake functions.

BACKGROUND INFORMATION

Many of today's vehicles have multiple brake functions, such as for example ABS, ESP, brake boosters, etc., via which the different braking operations may be made possible. Several of these brake functions are implemented via already present components that generate a pressure increase as well as the pressure control in the hydraulic system at the wheel brakes of a vehicle, so that the corresponding wheel is braked. In order to ensure sufficient safety during an application of the brake, various brake functions are designed redundantly. This means that in the case of failure of one of the components at least the most important functions continue to work completely or temporarily.

In order to not provide every system multiple times, various brake functions of the components may be taken over completely or temporarily by other components of the braking system that actually carry out other brake functions. Such a takeover of the most important brake functions takes place automatically to keep the time period of the failure of the important brake functions to a minimum. Likewise, other less important brake functions may be automatically dispensed with. PCT Patent Application No. WO 2017/001315 A1 describes a method for operating a braking system for a vehicle. The braking system has an electronic actuator and a pneumatic actuator for adjusting the brake pressure. In the method, an error of the electronic actuator is classified and it is switched over to the pneumatic actuator if the error signal is an error signal of a first error category.

SUMMARY

Specific embodiments of the present invention may improve an operation of a braking device including a main braking system and a backup braking system. The present invention described below is based on the ideas illustrated in the following. A switchover to a redundant braking system is correct in general, but it does not necessarily result in that the corresponding brake function continues to be carried out. Accordingly, it is possible that in the case of a switchover to the redundant braking system, the corresponding brake function cannot be carried out. If no further redundant system is present, it may be necessary to subsequently deactivate this brake function.

For this purpose, the present invention provides a method for operating a braking device of a vehicle, including a main braking system and a backup braking system, with the aid of which brake functions of the main braking system may be taken over, and a main braking system control unit, via which brake functions of the main braking system may be activated or deactivated, and a backup braking system control unit, which is connected to the main braking system control unit and via which brake functions of the backup braking system may be activated or deactivated.

In accordance with an example embodiment of the present invention, the method includes the steps of detecting an error of a brake function of the braking system in question, of locating the error inside the braking device, of classifying the error with regard to the corresponding brake function and the braking system, and of transferring a brake function detected as erroneous for the main braking system to the backup braking system in the event that this error concerns solely the main braking system, so that the brake function may still be carried out with the aid of the backup braking system.

The main braking system is a braking system that carries out as its main task a specific brake function, such as the detection of the braking intent of the driver with the aid of a pedal sensor, for example, as well as the pressure buildup in the hydraulic system necessary as a result thereof. In contrast, the backup braking system may also be a main braking system having the possibility of building up pressure, but which, as its main task, primarily carries out other brake functions, such as for example ABS and ESP, than the above-mentioned main braking system. The backup braking system may form a redundant system for the main braking system, which may take over or temporarily carry out various functions of the main braking system in the case of a failure of the main braking system. Each braking system has its own control unit, on which the method according to the present invention is executed. These control units are connected to one another, so that they may communicate with one another whether it is possible to continue to carry out the brake function in the case of a transfer to the backup brake function.

In the sense of the present invention, an "error" is understood to mean a malfunction of a component of the braking device, it being possible for the cause for the malfunction to be inside or outside of the braking system. One example of the cause outside of the braking system is, for example, a reduced electrical capacity of the energy supply (for example line or transfer resistance). This error results in that it is not possible to sufficiently carry out the corresponding brake function. After the error has been detected or established, it is subsequently located. A "classifying" is understood to mean the process, during which it is checked, what consequences the error has on specific functions inside the braking device. Accordingly, it may subsequently be decided whether a transfer to the backup braking system is reasonable.

This has the advantage that it may be established, even prior to an activation of the backup braking system, whether this braking system is able to take over the brake function. Likewise, this has the advantage that an operating state that results in a failure due to high power consumption and line resistance following the voltage drop may be avoided, in that this "high-power function" is transferred to the backup brake. Accordingly, the time for switching over and the subsequent re-establishing of an error is saved. In addition, the safety of the braking device is improved and all "low-power functions" (for example the pedal sensor) remain available.

In one preferred embodiment of the present invention, an error is detected prior to the failure of a brake function of the braking system if a measured parameter exceeds a threshold value defined therefor. This means that even during regular operation a future failure of a brake function is predicted. This is detected, for example, by measuring a line resistance or transfer resistance. The electric lines deteriorate with age, so that the line resistance increases. In the case of high-voltage applications, in particular, the necessary performance may thus no longer be made available starting from a specific resistance.

This may be measured in advance. For the corresponding measuring methods, reference is made to German Patent Application No. DE 10 2019 208 402 A1.

This method step has the advantage that even prior to the failure, it may be switched over to a backup braking system. Likewise, if one parameter in the backup braking system exceeds a threshold, this brake function may be directly switched off, before it fails, promptly after the switch to the backup braking system.

An error is preferably detected with the aid of a machine learning model trained for this purpose prior to the failure of a brake function of the braking system. For this purpose, pressure, voltage, resistance, and impedance values of the different lines, for example, are read in into a machine learning model. These data are processed in the machine learning model, so that results for a possible short-term failure of a brake function are predictable.

In one preferred embodiment of the present invention, the corresponding brake function is deactivated in the event that the error concerns the main braking system as well as the backup braking system. Prior to the transfer to the backup braking system, the corresponding brake function is completely deactivated based on the severity of the error. Accordingly, a deactivation takes place faster in the case of an error that concerns both braking systems.

A transfer to the backup braking system or a deactivation of the brake function may be perceived by the driver as a momentary reduction in the vehicle deceleration during braking. This may, however, result in the driver getting irritated, which is not desirable particularly during a braking operation. In a further preferred embodiment of the present invention, a warning is thus output to a driver prior to transferring the brake function to the backup braking system or deactivating the corresponding brake function. The warning may be output acoustically and/or visually via a display, for example. In this way, the driver is warned prior to a braking maneuver, so that it does not come as a surprise that the braking behavior is changed or certain driving maneuvers are stopped.

In order to reduce the time needed for classifying the error, the classification preferably takes place via a query of stored possible errors in a database. The database may be situated inside the control unit. The database may also be provided externally. This also includes a database that is accessible merely via a mobile connection in the case of a sufficiently high network speed. This database provides the appropriate result for the error of the corresponding braking device. In this way, a simulation potentially required in advance with regard to the backup braking system is not necessary, so that the classification is accelerated.

To detect the error, same is ascertained in one advantageous refinement based on the electrical, mechanical and/or hydraulic measured values. For this purpose, sensors that transmit the corresponding measured values to the control unit are preferably situated at specific positions. In this way, the error may be located and identified more precisely.

Advantageously, additional or already present errors in the backup braking system are incorporated into the classification prior to a transfer to the backup braking system. "Additional or already present errors" are understood to mean errors that have already been present prior to an occurrence of the error that results in the malfunction of the main braking system. This is particularly important if the already present error would result in a malfunction of the backup braking system already during transfer.

Accordingly, the brake function is advantageously deactivated in the event that during transfer of the brake function, the additional error in the backup braking system concerns the corresponding brake function. This improves the classification, so that a transfer of the function to the backup braking system is avoided.

In addition, a control unit is indicated that is designed to carry out such a method. The control unit monitors different brake functions, such as for example ABS, ESP, brake booster, TCS, as well as further additional functions and devices for the purpose of detecting the braking intent of the driver.

Exemplary embodiments of the present invention are illustrated in the figures and explained in greater detail in the description below.

DETAILED DESCRIPTION OF EXAMPLE EMBODIMENTS

Figure 1:
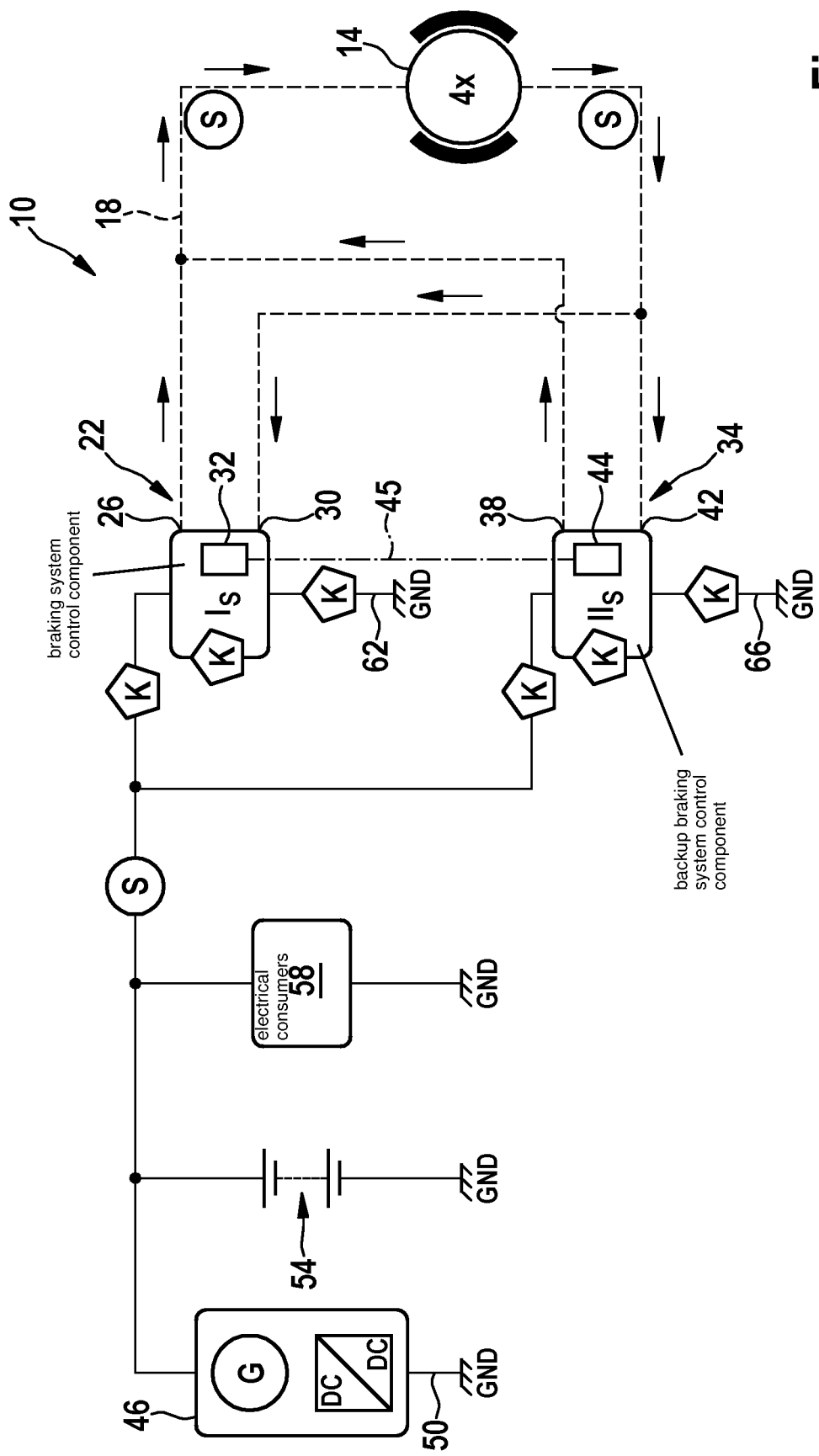
FIG. 1 shows a design of a possible braking device including various possible errors, in accordance with an example embodiment of the present invention.

FIG. 1 shows a design of a possible braking device 10 including various possible errors K, S. Braking device 10 includes four wheel brakes 14 that may be braked via a hydraulic device 18. Braking device 10 further includes a first braking system 22, which represents a main braking system in this case. Main braking system 22 includes a main braking system control component $I_s$ that is hydraulically connected to wheel brakes 14 via a main braking system supply line terminal 26 and a main braking system return line terminal 30, so that a brake pressure may be generated and modulated.

Main braking system 22 additionally includes a main braking system control unit 32 that is situated in the area of main braking system control component $I_s$ in this exemplary embodiment. With the aid of main braking system control unit 32, the brake functions of main braking system 22 may be activated or deactivated.

Braking device 10 additionally includes a second braking system 34 that forms a backup braking system for main braking system 22 in this case. Similarly to main braking system 22, backup braking system 34 includes a backup braking system control component $II_s$ including a corresponding backup braking system supply line terminal 38 and a backup braking system return line terminal 42, via which these are hydraulically connected to wheel brakes 14, so that a brake pressure for braking wheel brakes 14 may also be generated and modulated via backup braking system 34.

Similarly to main braking system 22, backup braking system 34 also includes a backup braking system control unit 44 that is situated in the area of backup braking system control component $II_s$ in this exemplary embodiment. Backup braking system control unit 44 is connected to main braking system control unit 32 via a signal line 45, via which the two control units 32, 44 may communicate with each other.

For electrical supply of braking device 10, an energy source 46, which includes generator G or a DC/DC converter, for example, is further situated in the vehicle. Energy source 46 has a ground connection 50, via which energy source 46 is connected to ground. Energy source 46 is additionally connected to an energy store 54 in the form of a battery that may be charged with the aid of energy source 46, so that same may also take over part of the energy supply. Via energy source 46 and battery 54, various electrical consumers 58, which are connected to energy source 46 and battery 54, may be supplied with energy.

Main braking system 22 and backup braking system 34 are also electrically connected to battery 54 and energy source 46, so that main braking system 22 and backup braking system 34 may be supplied with energy. Main braking system 22 additionally includes a separate main braking system ground connection 62, via which main braking system 22 is electrically connected to ground. Backup braking system 34 is electrically connected to ground in the same manner via a separate backup braking system ground connection 66.

In FIG. 1, various possible errors S, K are additionally identified by way of example. These errors S, K are plotted at different spots inside braking device 10 and the electrical supply. An error K refers to an error that concerns solely one of braking systems 22, 34. Errors K are situated with regard to braking systems 22, 34 for example in a direct electrical supply line to braking system 22, 34, in a control component $I_s$, $II_s$, or in corresponding ground connection 62, 66.

Errors S, however, concern main braking system 22 as well as backup braking system 34. These errors S may occur, for example, in energy supply 46, 54 of both braking systems 22, 34 or in the hydraulic lines directly upstream from wheel brakes 14. During a transfer of the corresponding brake function, the same error S would therefore occur in backup braking system 34, so that no improvement is thus achieved.

Via main braking system control unit 32 and backup braking system control unit 44, a corresponding brake function of braking systems 22, 34 may be activated or deactivated. Via control units 32, 44, various electrical, mechanical and/or hydraulic measured values may be additionally ascertained, so that an error is detectable even prior to a failure of a brake function.

Figure 2:
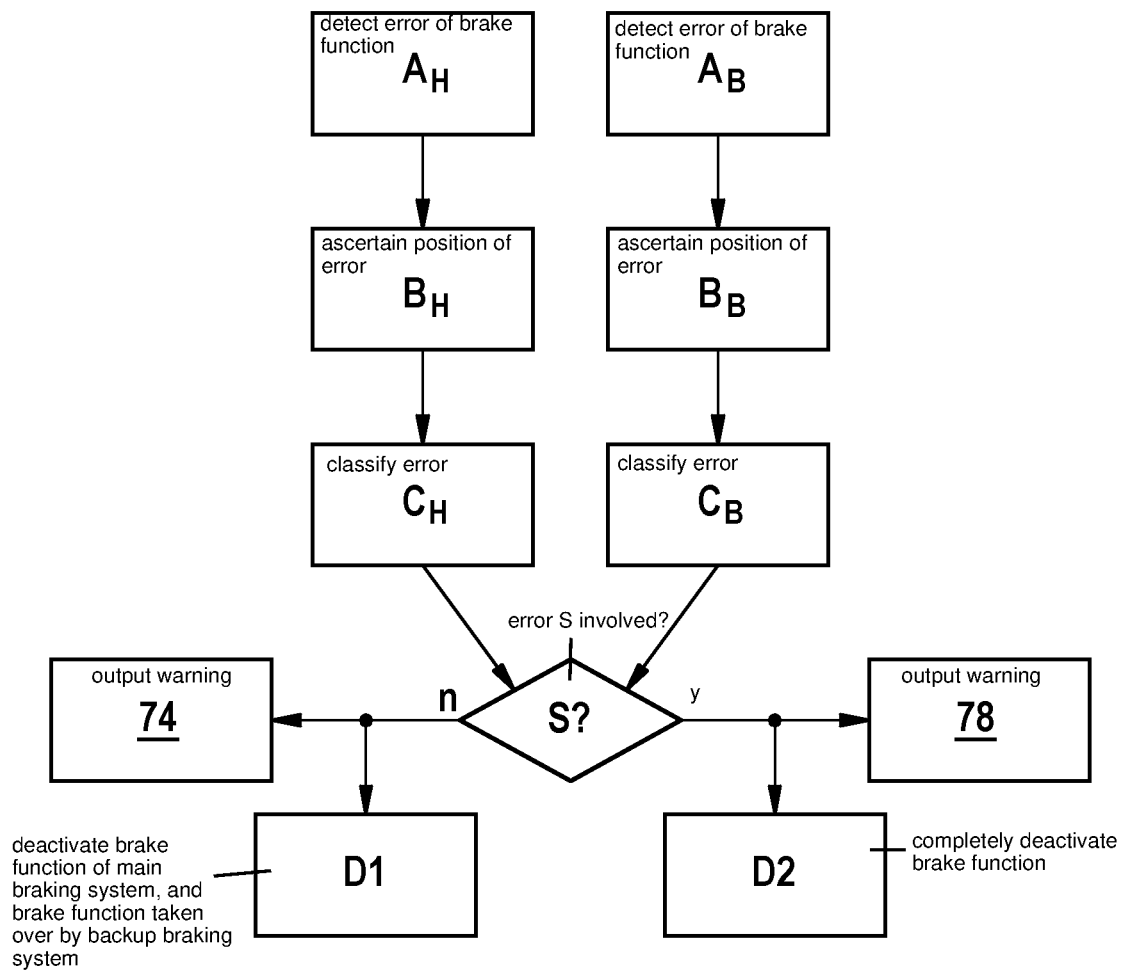
FIG. 2 shows one exemplary embodiment of a method according to the present invention for operating a braking device.

FIG. 2 shows one exemplary embodiment of a method according to the present invention for operating braking device 10. In a first step $A_H$, $A_B$, an error K, S of a brake function of main braking system 22 and of backup braking system 34 is detected based on the measured values, for example. In a second step $B_H$, $B_B$, error K, S is located inside braking device 10. This means that, for example based on the measured values, the position of error K, S or the corresponding erroneous component is ascertained. In this way, this error K, S may be classified in a third step $C_H$, $C_B$, so that it may be ascertained which braking systems 22, 34 are affected by this error K, S.

Classification $C_H$, $C_B$ of error K, S may be ascertained either autonomously by particular control units 32, 44 or control units 32, 44 may ascertain this based on the local positioning of error K, S and the measured values via a database (not shown), in which a plurality of error values is stored. As a result of a query of the database, time may be saved for classification $C_H$, $C_B$. During classification $C_H$, $C_B$, already present additional errors K, S in braking device 10 may also be incorporated.

As a result of classified error K, S, it is subsequently checked in control units 32, 44, whether this error K, S concerns solely main braking system 22 or additionally backup braking system 34. It is established during the check whether this error K, S further concerns the brake function after the transfer. If backup braking system 34 is not concerned by error K, S, i.e., if error "K" is involved, the brake function of main braking system 22 is deactivated and this brake function is taken over by backup braking system 34 in a next step D1. Prior to the transfer of the brake function, a warning 74 may, however, be output, indicating that backup braking system 34 immediately takes over the brake function.

If, however, the check results in that error K, S concerns both braking systems 22, 34, i.e., if an error "S" is involved, the corresponding brake function is completely deactivated in an alternative step D2. Prior to this, a corresponding warning 78 is output, however, which indicates that the corresponding brake function is no longer available. Based on this information, various driving maneuvers on the vehicle system level may be limited or completely stopped from this moment on.

By checking prior to the transfer whether error K, S concerns both braking systems 22, 34, it is ensured that it is not established only after the transfer that backup braking system 34 does not work either. This results in a temporal advantage for the degradation, the safety is increased and an unnecessary transfer is avoided.

What is claimed is:

1. A method for operating a braking device of a vehicle, the braking device including a main braking system, and a backup braking system via which brake functions of the main braking system may be taken over, the braking device further including a main braking system control unit, via which the brake functions of the main braking system may be activated or deactivated, and a backup braking system control unit, which is connected to the main braking system control unit and via which brake functions of the backup braking system may be activated or deactivated, the method comprising the following steps:
    detecting an error of a brake function of the braking device;
    locating the error inside the braking device;
    classifying the error with regard to the brake function and the braking device; and
    transferring a brake function detected as erroneous for the main braking system to the backup braking system when the error concerns solely the main braking system, so that the brake function may still be carried out using the backup braking system, wherein the error is detected prior to a failure of the brake function of the braking device, when a measured parameter exceeds a threshold value defined therefor.

2. A method for operating a braking device of a vehicle, the braking device including a main braking system, and a backup braking system via which brake functions of the main braking system may be taken over, the braking device further including a main braking system control unit, via which the brake functions of the main braking system may be activated or deactivated, and a backup braking system control unit, which is connected to the main braking system control unit and via which brake functions of the backup braking system may be activated or deactivated, the method comprising the following steps:
    detecting an error of a brake function of the braking device;
    locating the error inside the braking device;
    classifying the error with regard to the brake function and the braking device; and
    transferring a brake function detected as erroneous for the main braking system to the backup braking system when the error concerns solely the main braking system, so that the brake function may still be carried out using the backup braking system, wherein the error is detected using a machine learning model trained for this purpose prior to a failure of the brake function of the braking device.

3. A method for operating a braking device of a vehicle, the braking device including a main braking system, and a backup braking system via which brake functions of the main braking system may be taken over, the braking device further including a main braking system control unit, via which the brake functions of the main braking system may be activated or deactivated, and a backup braking system control unit, which is connected to the main braking system control unit and via which brake functions of the backup braking system may be activated or deactivated, the method comprising the following steps:

- detecting an error of a brake function of the braking device;
- locating the error inside the braking device;
- classifying the error with regard to the brake function and the braking device; and
- transferring a brake function detected as erroneous for the main braking system to the backup braking system when the error concerns solely the main braking system, so that the brake function may still be carried out using the backup braking system, wherein the brake function is deactivated when the error concerns the main braking system and the backup braking system.

4. The method as recited in claim 3, wherein a warning is output to a driver prior to transferring the brake function to the backup braking system or deactivating the brake function.

5. A method for operating a braking device of a vehicle, the braking device including a main braking system, and a backup braking system via which brake functions of the main braking system may be taken over, the braking device further including a main braking system control unit, via which the brake functions of the main braking system may be activated or deactivated, and a backup braking system control unit, which is connected to the main braking system control unit and via which brake functions of the backup braking system may be activated or deactivated, the method comprising the following steps:

- detecting an error of a brake function of the braking device;
- locating the error inside the braking device;
- classifying the error with regard to the brake function and the braking device; and
- transferring a brake function detected as erroneous for the main braking system to the backup braking system when the error concerns solely the main braking system, so that the brake function may still be carried out using the backup braking system, wherein the classification takes place via a query of stored possible errors in a database.

6. The method as recited in claim 1, wherein the error is ascertained based on electrical, and/or mechanical and/or hydraulic measured values.

7. A method for operating a braking device of a vehicle, the braking device including a main braking system, and a backup braking system via which brake functions of the main braking system may be taken over, the braking device further including a main braking system control unit, via which the brake functions of the main braking system may be activated or deactivated, and a backup braking system control unit, which is connected to the main braking system control unit and via which brake functions of the backup braking system may be activated or deactivated, the method comprising the following steps:

- detecting an error of a brake function of the braking device;
- locating the error inside the braking device;
- classifying the error with regard to the brake function and the braking device; and
- transferring a brake function detected as erroneous for the main braking system to the backup braking system when the error concerns solely the main braking system, so that the brake function may still be carried out using the backup braking system, wherein additional or already present errors in the backup braking system are incorporated into the classification prior to the transfer to the backup braking system.

8. The method as recited in claim 7, wherein the brake function is deactivated in the event that during the transfer of the brake function, the additional error concerns a corresponding brake function in the backup braking system.

9. A control unit of a braking device configured to operate the braking device of a vehicle, the braking device including a main braking system, and a backup braking system via which brake functions of the main braking system may be taken over, the braking device further including a main braking system control unit, via which the brake functions of the main braking system may be activated or deactivated, and a backup braking system control unit, which is connected to the main braking system control unit and via which brake functions of the backup braking system may be activated or deactivated, the control unit configured to:

- detect an error of a brake function of the braking device;
- locate the error inside the braking device;
- classify the error with regard to the brake function and the braking device; and
- transfer a brake function detected as erroneous for the main braking system to the backup braking system when the error concerns solely the main braking system, so that the brake function may still be carried out using the backup braking system, wherein the error is detected prior to a failure of the brake function of the braking device, when a measured parameter exceeds a threshold value defined therefor.

10. A control unit of a braking device configured to operate the braking device of a vehicle, the braking device including a main braking system, and a backup braking system via which brake functions of the main braking system may be taken over, the braking device further including a main braking system control unit, via which the brake functions of the main braking system may be activated or deactivated, and a backup braking system control unit, which is connected to the main braking system control unit and via which brake functions of the backup braking system may be activated or deactivated, the control unit configured to:

- detect an error of a brake function of the braking device;
- locate the error inside the braking device;
- classify the error with regard to the brake function and the braking device; and
- transfer a brake function detected as erroneous for the main braking system to the backup braking system when the error concerns solely the main braking system, so that the brake function may still be carried out using the backup braking system, wherein the control unit is configured to monitor brake functions selected from a function group including: ABS, ESP, brake booster, TCS.

11. A non-transitory computer-readable medium on which is stored a computer program including program code for operating a braking device of a vehicle, the braking device including a main braking system, and a backup braking system via which brake functions of the main braking system may be taken over, the braking device further including a main braking system control unit, via which the brake functions of the main braking system may be activated or deactivated, and a backup braking system control unit, which is connected to the main braking system control unit and via which brake functions of the backup braking system may be activated or deactivated, the program code, when executed by a control unit, causing the control unit to perform the following steps:

detecting an error of a brake function of the braking device;

locating the error inside the braking device;

classifying the error with regard to the brake function and the braking device; and transferring a brake function detected as erroneous for the main braking system to the backup braking system when the error concerns solely the main braking system, so that the brake function may still be carried out using the backup braking system, wherein the error is detected prior to a failure of the brake function of the braking device, when a measured parameter exceeds a threshold value defined therefor.

12. A vehicle, comprising:

a control unit of a braking device of the vehicle configured to operate the braking device of the vehicle, the braking device including a main braking system, and a backup braking system via which brake functions of the main braking system may be taken over, the braking device further including a main braking system control unit, via which the brake functions of the main braking system may be activated or deactivated, and a backup braking system control unit, which is connected to the main braking system control unit and via which brake functions of the backup braking system may be activated or deactivated, the control unit configured to:

detect an error of a brake function of the braking device;

locate the error inside the braking device;

classify the error with regard to the brake function and the braking device; and transfer a brake function detected as erroneous for the main braking system to the backup braking system when the error concerns solely the main braking system, so that the brake function may still be carried out using the backup braking system, wherein the error is detected prior to a failure of the brake function of the braking device, when a measured parameter exceeds a threshold value defined therefor.

\* \* \* \* \*